US006182923B1

(12) United States Patent
Weinhart

(10) Patent No.: US 6,182,923 B1
(45) Date of Patent: Feb. 6, 2001

(54) HELICOPTER WITH CONTROL BY DISPLACEMENT OF ITS CENTER GRAVITY

(76) Inventor: Franz Weinhart, Heubergstrasse 2a, Flintsbach, DE-83126 (DE)

( * ) Notice: Under 35 U.S.C. 154(b), the term of this patent shall be extended for 0 days.

(21) Appl. No.: 09/235,277

(22) Filed: Jan. 22, 1999

(30) Foreign Application Priority Data

Jan. 22, 1998 (DE) .............................................. 198 02 256

(51) Int. Cl.$^7$ .................................................. B64C 27/04
(52) U.S. Cl. ...................................... 244/17.25; 244/17.11
(58) Field of Search ............................ 244/17.11, 17.23, 244/17.25, 39, 54

(56) References Cited

U.S. PATENT DOCUMENTS 3,045,950 * 7/1962 Jennings, Jr. ...................... 244/17.11
3,765,622 * 10/1973 Haines ................................ 244/17.11

FOREIGN PATENT DOCUMENTS

| 2 155 817 | 3/1973 | (DE) . |
| WO 84/00339 | 2/1984 | (WO) . |
| WO 97/44240 | 11/1997 | (WO) . |

* cited by examiner

Primary Examiner—Robert P. Swiatek
(74) Attorney, Agent, or Firm—Nixon & Vanderhye PC

(57) ABSTRACT

In the case of a helicopter comprising a rotor system (3) with rotor blades (6 and 6') held on a fuselage (2) and at least one rotor shaft (5 and 5') and furthermore comprising a drive system (4) for causing rotation of the rotor system (3), the rotor system (3) together with the drive system (4) is able to be slid in the longitudinal direction of the fuselage (2) and to be pivoted around a pivot axis extending along the fuselage (2).

6 Claims, 4 Drawing Sheets

HELICOPTER WITH CONTROL BY DISPLACEMENT OF ITS CENTER GRAVITY

The invention relates to a helicopter in accordance with the preamble of claim 1 herein.

The direction of flight of a conventional helicopter may be changed by alteration of the angle of the rotor blades. Thus more particularly in the case of coaxial helicopters with rotors moving in opposite directions collective and cyclical adjustment of the blade angle is employed in order to maneuver the helicopter in the vertical and, respectively, in other directions. Whereas in the case of collective blade adjustment, which brings about a vertical flight maneuver, the angle of attack of the rotor blades is globally changed, cyclical blade adjustment means that the angle of attack of an individual blade is changed in a particular position of rotation. Cyclical blade adjustment, which causes forward flight or, respectively, a change in the direction of flight to the side, is conventionally brought about by means of a swash plate arranged functionally adjacent to a rotor shaft.

It is a disadvantage in the case of such known helicopters that the cyclical blade control by means of such swash plates leads to a more elaborate design so that the costs of production and weight are correspondingly increased. Moreover, the swash plate system is subject to a high wear rate, something which makes necessary the replacement of expensive parts at short intervals of time. Cyclical blade adjustment furthermore requires an additional amount of power, something which reduces the efficiency of the drive system.

Accordingly one object of the present invention is to create a helicopter in accordance with the preamble of claim 1, which is able to be controlled by means of a simpler, more economic and more readily serviced control system and furthermore has a higher efficiency.

This object is to be achieved by the features of claim 1. Advantageous developments of the invention are described in the further claims.

In the case of the helicopter of the invention the rotor system is able to be moved in translation in the longitudinal direction of the helicopter fuselage together with the drive system and is able to be pivoted about a pivot axis running along the fuselage. Owing to the longitudinal displacement of the rotor and drive system in relation to the fuselage the center of gravity of the helicopter is so changed that the helicopter is inclined about its transverse axis forward and, respectively, backward so that forward flight may be accelerated and, respectively, retarded. The pivoting about the pivot axis running along the fuselage on the other hand causes an inclination of the helicopter to the left or to the right so that it is possible for corresponding curves to be flown.

The helicopter in accordance with the invention offers the advantage that cyclical blade control, that is to say the swash plate and its control elements, may be completely dispensed with so that the overall structure is substantially simplified. This means that there are lower costs of production, less wear, substantially longer intervals between servicing and therefore lower serving costs. Furthermore mechanical effort for cyclical blade angle addition is no longer necessary and accordingly the efficiency of the overall system is improved. A further advantage is that owing to the possibility of inclining the rotor system about the longitudinal axis of helicopter improved take-off and landings on hills become possible.

The control of the center of gravity of the helicopter of the invention further leads to a significant saving in weight and to operation of the rotor with less vibrations. Moreover following engine failure gliding with the rotor freewheeling (autorotation) is substantially simpler, the use of a suitable inclination of the rotor blades shortly before landing meaning that a relatively gentle touch-down is possible even without engine drive. The helicopter furthermore responds extremely rapidly to corresponding changes in the center of gravity so that extremely precise and simple control or steering of the helicopter is possible. Unlike known helicopters response to control commands is improved with an increase in load, that is to say a higher mass of the fuselage instead of being reduced.

In accordance with an advantageous embodiment of the invention a semi-cardanic suspension is provided for longitudinal transverse and pivoting of the rotor system, such suspension having at least one central support axle held on the fuselage. The central support axle in this case simultaneously defines both the longitudinal axis, along which the rotor system and possibly the drive system is able to be longitudinally moved, and also the pivot axis, about which the rotor and possibly the drive as system well may be laterally tipped.

In accordance with an advantageous embodiment of the invention the adjustment of the blade angle is performed by means of longitudinal displacement of a sliding sleeve, which is held on the rotor shaft in a manner allowing sliding but not rotary movement and is functionally connected with the rotor blades.

Such a sliding sleeve is preferably arranged to be longitudinally slid by means of a linkage, which is fixed on the sliding sleeve in the direction of sliding while being held in relation to same while allowing relative rotary movement and is able to be slid using a lever mechanism in the longitudinal direction of the rotor shaft.

The invention will now be described in detail with reference to the drawings by way of example.

Figure 2:
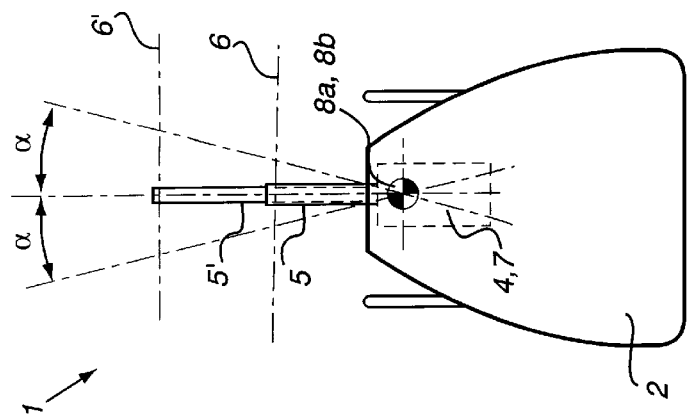
FIG. 2 shows a diagrammatic front view of the helicopter in accordance with FIG. 1.
Figure 1:
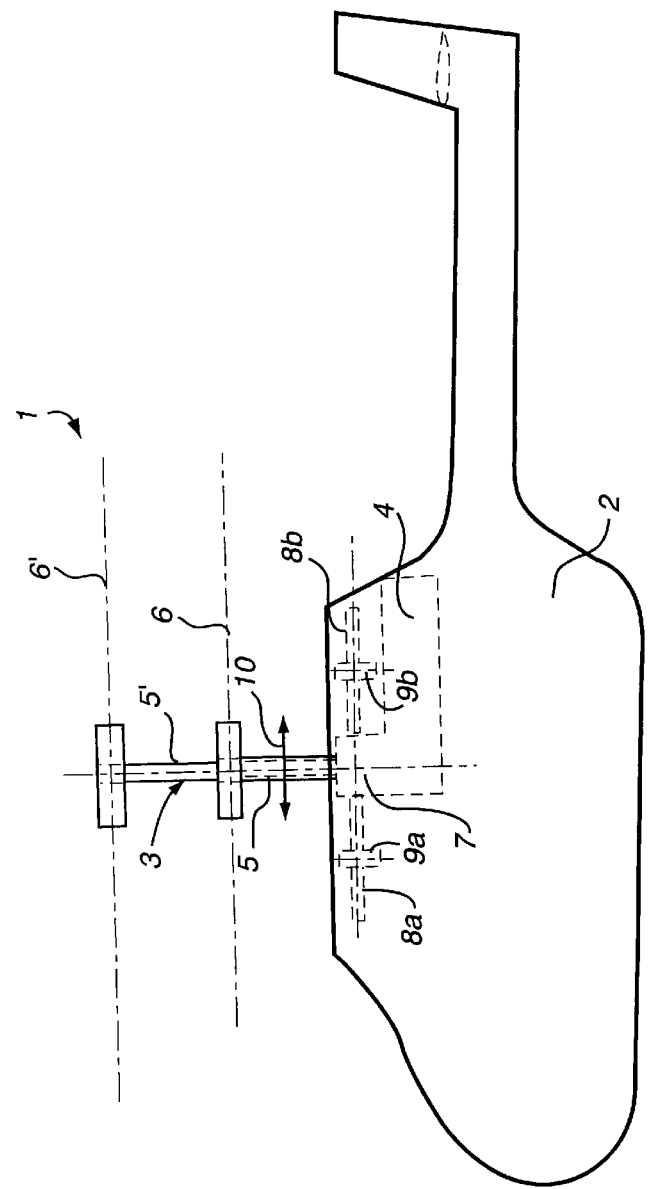
FIG. 1 shows a diagrammatic side view of a first embodiment of the helicopter of the invention.

In the FIGS. 1 and 2 the reader will see a helicopter 1 of the coaxial type having a fuselage 2, a rotor system 3 and a drive system 4 for causing rotation of the rotor system 3.

The rotor system 3 comprises a hollow, shorter, external rotor shaft 5, which is caused to rotate by the drive system 4 and drives lower rotor blades 6, which are merely indicated diagrammatically. Within the external rotor shaft 5 there coaxially extends an internal rotor shaft 5' projecting past the external rotor shaft 5 in an upward direction, such rotor shaft being caused to rotate by the drive system 4 in the opposite direction to the external rotor shaft 5, and which drives upper rotor blades 6', also indicated diagrammatically, in the opposite direction to the lower rotor blades 6.

The drive system 4 may for example comprise a conventional turbine or a piston engine with a suitable transmission connected with the rotor shafts 5 and 5'.

Adjacent to the base of the external and, respectively, internal drive shaft 5 and 5' the drive system 4 possesses an upwardly projecting housing section 7, from which a central support axle 8a extends in the longitudinal direction of the fuselage 2 forward and a further central support axle 8b to the rear in the longitudinal direction of the fuselage 2. The support axles 8a and 8b are aligned with each other and are supported rotatably in bearings 9a and 9b for rotation about their own axes and sliding movement in the longitudinal direction, such bearings 9a and 9b being located on either side of the housing section 7 and being attached in the upper part of the fuselage 2 on same in its longitudinal plane of symmetry. During flying accordingly the entire fuselage 2 is suspended via the two bearings 9a and 9b from the two support axles 8a and 8b, which are connected permanently with the housing section 7 of the drive system 4.

Since the support axles 8a and 8b are not in contact at their adjacent ends and in fact extend away from the external periphery of the housing section 7, there is sufficient space in the interior of the housing section 7 to receive the lower ends of the external and, respectively, internal rotor shafts 5 and 5' and, respectively, to receive the corresponding drive or holding parts for the rotor shafts 5 and 5'.

As indicated by the double arrow 10 in FIG. 1 owing to the arrangement allowing for longitudinal movement of the support axles 8 and 8b in the bearings 9a and 9b it is possible for the entire rotor system 3 and the drive system 4 to be shifted in the longitudinal direction of the fuselage 2. The displacement mechanism, which may be hydraulic or mechanical (with a toothed rack) for instance, is not illustrated. In FIG. 1 a middle position is illustrated. The rotor system 3 or, respectively, the drive system 4 may be displaced until the housing section 7 strikes against the front bearing 9a. In a similar manner it is possible for the rotor system and the drive system 4 to be moved to the rear until the housing section 7 runs against the rear bearing 9b. In this respect it is possible for the drive system to extend through a suitable opening in the fuselage to the rear through the fuselage. Such a displacement means that the center of gravity of the helicopter 1 will be moved accordingly. If the rotor system 3 and the drive system 4 are displaced forward toward the front bearing 9a, the nose of the helicopter 1 will be turned somewhat in an upward direction and its rear parts will be turned somewhat downward, i. e. there is a corresponding inclination in the clockwise direction in terms of FIG. 1. This causes a corresponding inclination of the rotor shafts 5 and 5' and accordingly of all rotor blades 6 and 6' so that the speed of flight in the forward direction is reduced. On the other hand the nose of the helicopter 1 will be inclined downward if the rotor system 3 and the drive system 4 are displaced to the rear toward the rear bearing 9b, something which causes a corresponding increase in the speed of flight in the forward As indicated diagrammatically in FIG. 2 the support axles 8a and 8b are not only mounted inside the bearings 9a and 9b to permit longitudinal sliding movement but also to permit rotation about their own longitudinal axis. This means that it is possible for the rotor system 3 and the drive system 4 to be pivoted additionally about the longitudinal axis as defined by the support axles 8a and 8b to either side about the angle a in relation to the fuselage 2. Such pivoting around the longitudinal axis will cause the helicopter 1 to fly along a curved path to the right or to the left.

As an alternative to the two support axles 8a and 8b, which are illustrated in FIG. 1 and perform ganged motion with the drive system 4, it is however quite possible to provide a single continuous support axle, same being mounted for longitudinal sliding and rotary motion in the bearings 9a and 9b. It is furthermore also possible to attach such a continuous support axle on the fuselage 2 in an immovable fashion and to mount the housing section 7 of the drive system 4 on the central support axle in a longitudinally sliding and pivoting manner.

Figure 4:
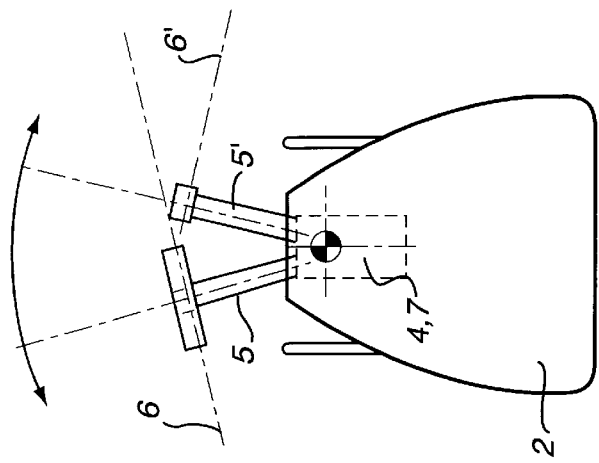
FIG. 4 is a diagrammatic front view of the helicopter in accordance with FIG. 3.
Figure 3:
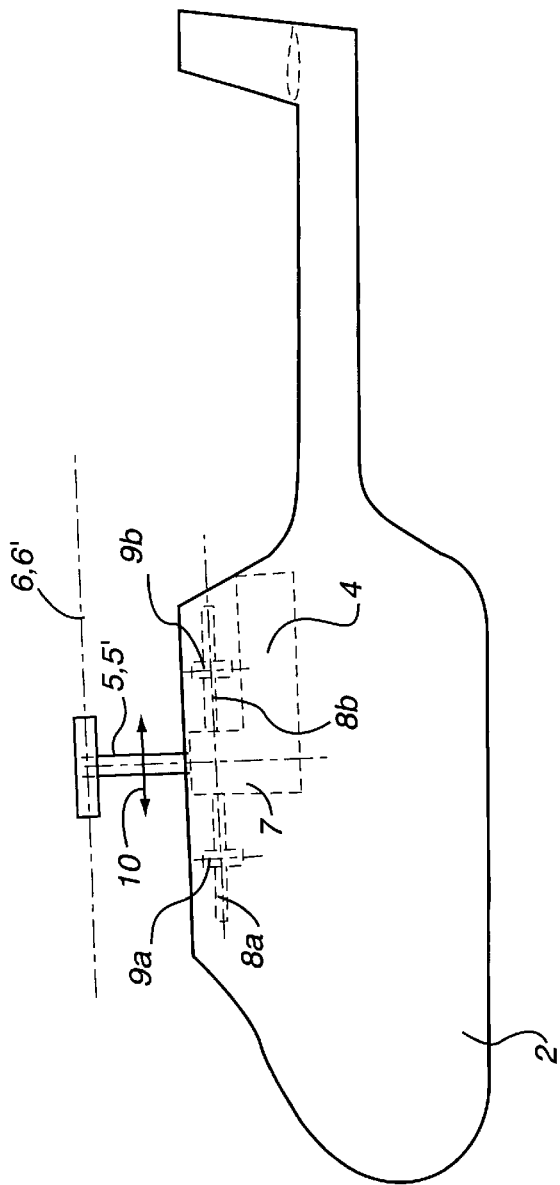
FIG. 3 shows a diagrammatic side view of a second embodiment of the helicopter of the invention.

The FIGS. 3 and 4 show a further embodiment of the invention. In the case of this working example the two rotor shafts 5 and 5' are not arranged coaxially in relation to each other, but at a certain angle obliquely to one another (FIG. 4). The rotor blades 6 and 6', which are only illustrated diagrammatically, are in mesh with each other. The ability of the rotor system 3 to move longitudinally and pivotally in relation to the fuselage 2 and furthermore the attachment to the fuselage 2 are provided in the same manner as in the case of the working embodiment of FIGS. 1 and 2.

The suspension system illustrated in FIGS. 1 through 4 may be termed a semi-cardanic suspension, On the basis of FIG. 5 the basic components for adjustment of blade angle in the working example of FIGS. 1 and 2 will be described. A collective adjustment of blade angle in this case causes control of vertical flight, whereas an opposite adjustment of the blade angle may be employed for control of the helicopter 1 about its vertical axis.

Figure 5:
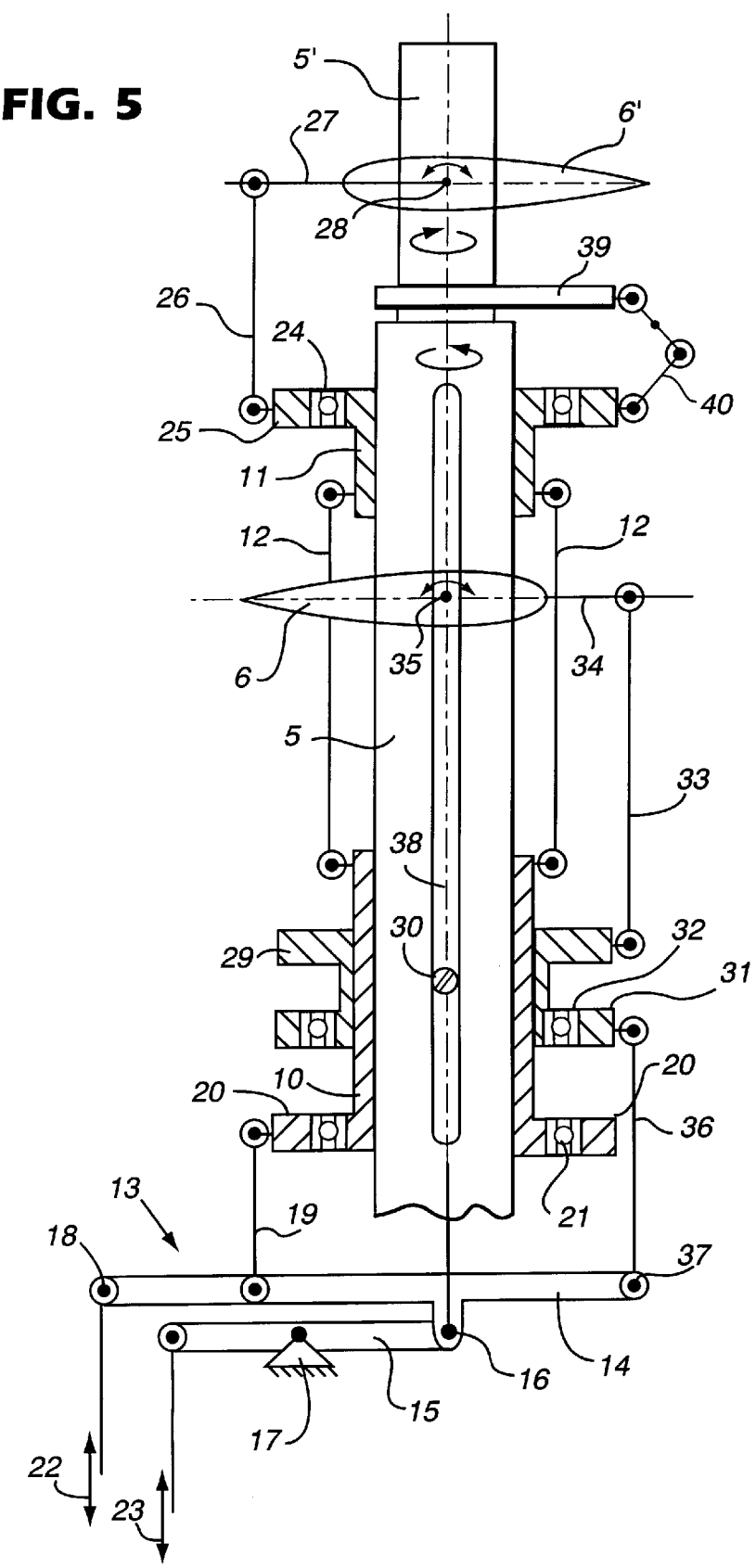
FIG. 5 is a diagrammatic longitudinal section taken through the rotor system of the helicopter in accordance with FIGS. 1 and 2 adjacent to the rotor shafts.

As shown in FIG. 5 the external rotor shaft 5 is surrounded by a bottom sliding sleeve 10 and a top sliding sleeve 11, which are arranged for longitudinal motion in relation to the external rotor shaft 5 while being locked in rotation thereon. The means for preventing rotation in relation to the rotor shaft 5 is by means of an entraining means 38 in the form of a rotor shaft key, which is fitted in a suitable longitudinal keyway in the sliding sleeves 10 and 11. The two sliding sleeves 10 and 11 may consequently be moved in the longitudinal direction of the rotor and rotate with same. Both sliding sleeves 10 and 11 are employed for adjustment of the angle of the blades of the top rotor blades 6', which are attached to the internal rotor shaft 5'. The bottom sliding sleeve 10 is coupled with the top sliding sleeve 11 by means of thrust rods 12 so that longitudinal sliding movement of the bottom sleeve 10 results in a corresponding longitudinal sliding movement of the top sliding sleeve 11.

The sliding of the bottom sliding sleeve 10 is caused by means of a lever mechanism 13, which in the illustrated working embodiment of FIG. 5 comprises a first pivot lever 14 and a second pivot lever 15. The first pivot lever 14 is pivot-mounted on a bearing means 16 at a point between its two ends on a free end of the second pivot lever 15. The second pivot lever 15 is pivoted at a point between its two free ends at a bearing means 17. In the part between the bearing means 16 and the end 18, which is on the left in FIG. 5, a thrust rod 19 is pivotally connected, whose other end is attached to a sliding ring 20, which is mounted by means of an anti-friction bearing 21 on the sliding sleeve 10. The anti-friction bearing is so designed that axial forces may be transmitted from the sliding ring 20 to the sliding sleeve 10. During flight the sliding sleeve 10 will rotate together with the external rotor shaft 5, whereas the sliding sleeve 20 and the thrust rod 19 do not perform any rotation.

If the first pivot lever 14 and/or the second pivot lever 15 is pivoted, as is indicated by the arrows 22 and, respectively, 23, the bottom sliding sleeve 10 will be displaced axially on the external rotor shaft 5 by means of the thrust rod 19, the sliding sleeve 20 and the anti-friction bearing 21. The result of this is that a corresponding displacement of the top sliding sleeve 11 is caused via the thrust rods 12. A sliding ring 25 is mounted like the sliding sleeve 20, on the top sliding sleeve 11 by means of an anti-friction bearing 24. On the sliding ring 25 a thrust rod 26 is attached, which so transmits the displacement movement of the sliding ring 25 by means of a transmission element 27 to the top rotor blades 6' that the angle of attack thereof in relation to the horizontal is correspondingly changed. The pivot axis of the rotor blades 6' is in this case referenced 28. The rotary motion of the internal rotor shaft 5' is transmitted via an entrainment hub 39, keyed on such shaft, and an entrainment joint on the external sliding ring 25.

It will be seen from the above arrangement that the sliding ring 25, the thrust rod 26 and the transmission element 27 rotate with the internal rotor shaft 5' and, respectively, the top rotor blades 6' and accordingly oppositely to the external-rotor shaft 5 and the top sliding sleeve 11.

For adjustment of the angle of the bottom rotor blades 6 a sliding sleeve 29 is provided, which is mounted in an axially sliding fashion on the bottom sliding sleeve 10, the latter however being keyed to the external rotor shaft 5 to prevent relative rotation. Prevention of relative rotation in this case is ensured by a pin-like entrainment means 30, which is fixed to the external rotor shaft 5 and extends through a corresponding longitudinal slot in the bottom sliding sleeve 10 and through and into a longitudinal slot in the sliding sleeve 29. The longitudinal displacement of the sliding sleeve 29 is again caused by an external sliding ring 21, which is mounted by means of an anti-friction bearing 32 on the sliding sleeve 29. The function and type of bearing means for the sliding ring are consequently the same as for the sliding ring 20.

A thrust rod 33 is secured to the sliding sleeve 29 to transmit the axial displacement of the sliding sleeve to a transmission element 34, which is functionally connected with the bottom rotor blade 6 and gives rise to a corresponding pivoting about the pivot axis 35.

The axial displacement of the sliding ring 31 and consequently of the sliding sleeve 29 is caused via a thrust rod 36 attached to the sliding ring 31 and pivoted to the free end 37 of the first pivot lever 14.

Owing to the different arrangement on pivoting of the first pivot lever 14 around the bearing means 16 there is an oppositely directed adjustment of the bottom rotor blades 6 in relation to the top rotor blades 6', because the sliding sleeves 10 and 11 are displaced in the opposite direction to the sliding sleeve 29. Such an oppositely directed blade adjustment will cause control about the vertical axis of the helicopter 1.

On the other hand pivoting of the second pivot lever 15 will effect a collective blade adjustment, that is to say the rotor blades 6 and 6' are pivoted in the same direction. This will cause a corresponding vertical control of the helicopter 1.

In the following adjustment of the blade angle will be described in the case of a helicopter as depicted in FIGS. 3 and 4 as the second embodiment of the invention. In the case of this embodiment of the invention both of the two rotor shafts 5 and 5' inclined obliquely toward one another are surrounded by a sliding sleeve 10 and 10', which are each arranged in a longitudinally sliding fashion on the rotor shafts 5 and 5' with which they are connected by means of a groove and key-like entraining means 38 and 38'. In the bottom region of the sliding sleeves 10 and 10', and in the same manner as in the case of the sliding sleeve 10 in FIG. 5, sliding rings 20 and 20' are mounted on anti-friction bearings 21 and 21', which may be displaced in the longitudinal direction of the rotor shafts 5 and 5' and then correspondingly entrain the sliding sleeves 10 and 10'. At the top end of the sliding sleeves 10 and 10' thrust rods 26 and 26' are again attached, which on axial motion pivot the rotor blades 6 and 6' via suitable transmission elements 27 and 27' around their pivot axes 28 and 28'.

Figure 6:
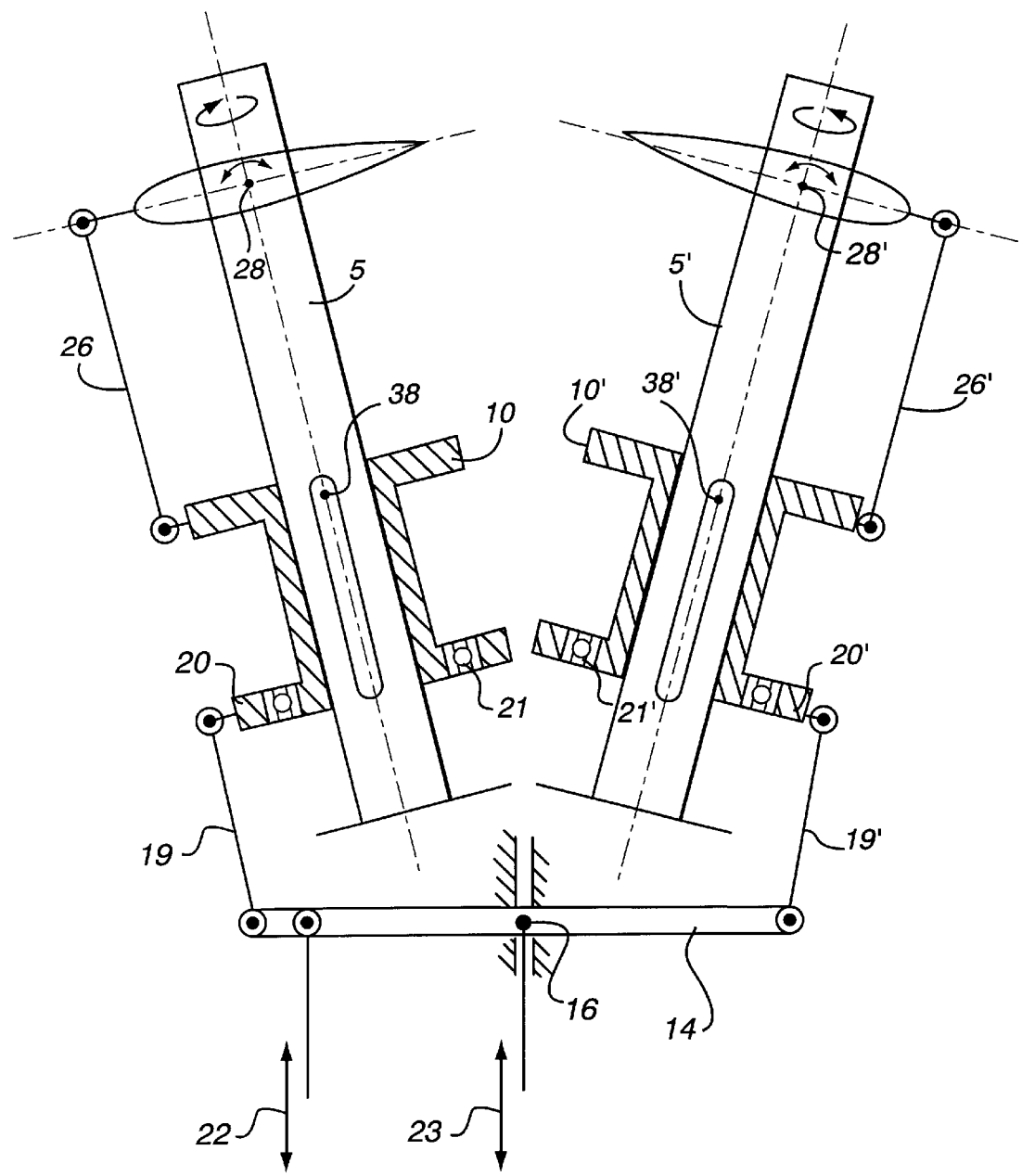
FIG. 6 is a diagrammatic longitudinal section taken through the rotor systems of the helicopter of FIGS. 3 and 4 adjacent to the rotor shafts.

The sliding of the sliding sleeves 10 and 10' as illustrated in FIG. 6 is caused using a common pivot lever 14, the thrust rod 19 being pivotally attached to one end of the pivot lever 14 and the thrust rod 19' being pivotally attached to the other end of the thrust rod 19'. If the pivot lever 14 is bodily moved downward or upward, as is indicated by the arrow 23, then both the sliding sleeve 10 and also the sliding sleeve 10' will be moved downward or upward in the same direction in the same direction so that a collective adjustment of blades takes place. If on the other hand the pivot lever 14 is pivoted around the bearing means 16 there will be an opposite blade adjustment, because the sliding sleeves 10 and 10' are disposed in opposite directions. This is indicated. by the arrow 22.

It is to be noted that FIGS. 5 and 6 only respectively show thrust rods 26 and 33 and transmission elements 27 and 34 for a single rotor blade 6 and 6' diagrammatically. Each individual rotor blade 6 and 6' associated with a given rotor shaft 5 and 5' does however possess corresponding thrust rods 26 and 33 and, respectively, transmission elements 27 and 34 so that all rotor blades 6 and 6' of a given rotor shaft 5 and 5' may be pivoted in the same fashion below.

What is claimed is:

1. A helicopter comprising a rotor system with rotor blades held on a fuselage and at least one rotor shaft and furthermore comprising a drive system for causing rotation of the rotor system wherein the rotor system together with the drive system is able to be slid in the longitudinal direction of the fuselage and to be pivoted around a pivot axis extending along the fuselage.

2. The helicopter as claimed in claim 1, wherein, for longitudinal displacement and pivoting of the rotor system and of the drive system, a semi-cardanic suspension is provided, which possesses at least one central support axle held on the fuselage.

3. The helicopter as claimed in claim 2, wherein the rotor system and the drive system are permanently connected with the central support axle and same is mounted on the fuselage in a longitudinally sliding and rotatable manner.

4. The helicopter as claimed in claim 2, wherein the central support axle is fixed on the fuselage and the rotor system and the drive system are mounted in a longitudinally sliding and rotatable manner on the support axle.

5. The helicopter as claimed in claim 1, wherein angle adjustment of the rotor blades is performed by displacement of at least one sliding sleeve, which is functionally held in a manner permitting longitudinal sliding but preventing rotation on the rotor shaft and is functionally connected with the associated rotor blades.

6. the helicopter as claimed in claim 5, wherein the at least one sliding sleeve is able to be longitudinally slid by means of a sliding means, which is held on the at least one sliding sleeve in a rotatable manner and is able to be slid by means of a lever mechanism in the longitudinal direction of the rotor shaft.

\* \* \* \* \*